W. G. SWARTZ.
Insect-Destroyers.
No. 154,530. Patented Aug. 25, 1874.
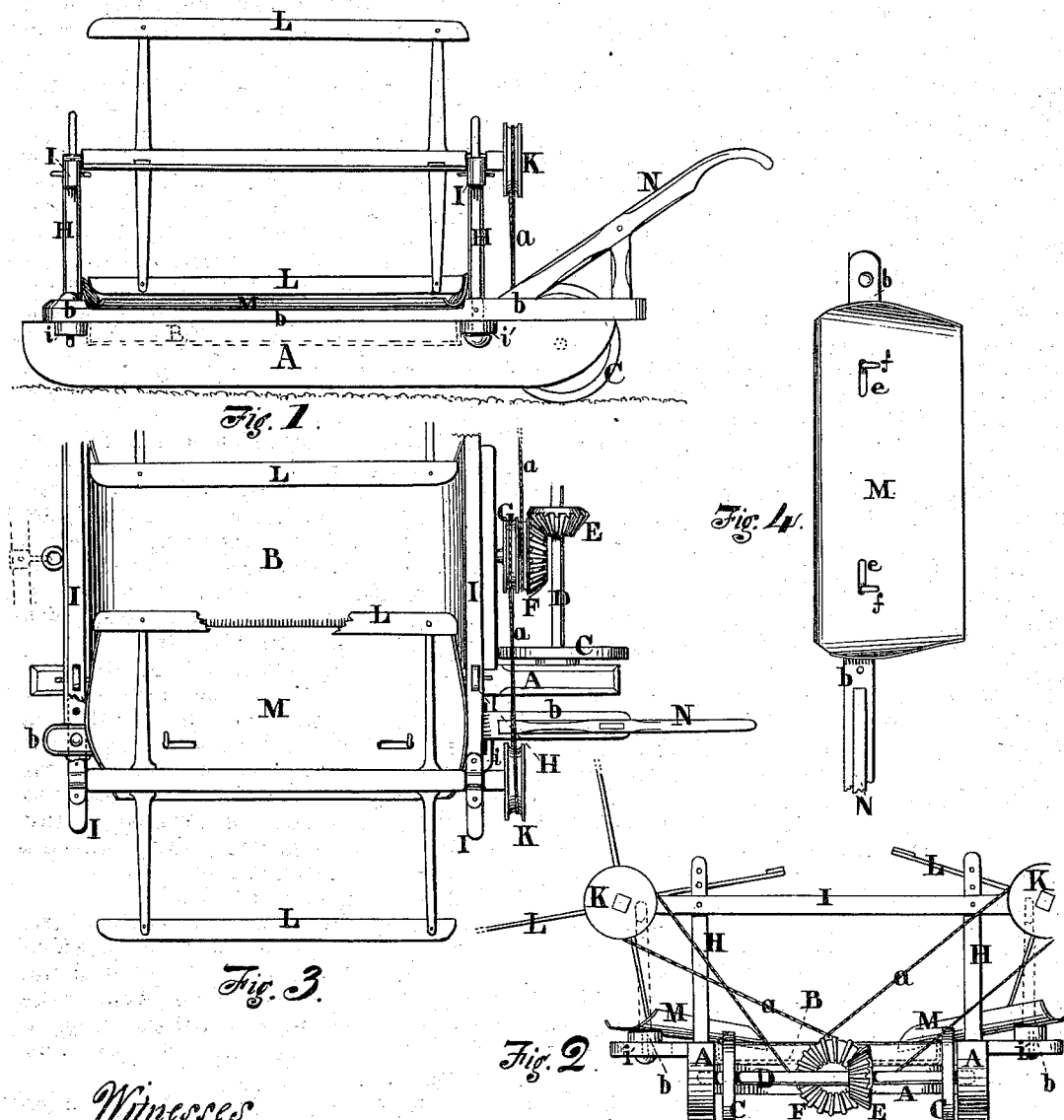

UNITED STATES PATENT OFFICE.

WILLIAM G. SWARTZ, OF FAIRVIEW, ILLINOIS.

IMPROVEMENT IN INSECT-DESTROYERS.

Specification forming part of Letters Patent No. 154,530, dated August 25, 1874; application filed June 2, 1874.

*To all whom it may concern:*

Be it known that I, WILLIAM G. SWARTZ, of Fairview, in the county of Fulton, in the State of Illinois, have invented a Machine for Gathering Bugs or Worms from Potato or other Plants; and do hereby declare that the following is a full, clear, and exact description thereof, reference being had to the annexed drawings making a part of this specification, in which like letters of reference refer to like parts, and in which—

Figure 1 represents a longitudinal elevation; Fig. 2, an end view from the rear of machine; Fig. 3, a plan or superficial view; Fig. 4, plan view of movable tray and pivot-bar.

The object of this invention is to gather the bugs which infest potato-plants, and in so doing to operate upon two rows at one time, the machine to be drawn by one horse, or, if in small plantations, by hand.

To do this I provide a frame, A, sled-shaped in front, to pass along the ground between two rows of plants, but raised behind upon low wheels C, for the purpose of obtaining motion for revolving the reels or beaters L L, on either side of the machine, by means of a pinion, E, on the wheel-axle D, pinion F, and double pulley G, which latter rotates, by means of a band or chain, $a$, a pulley, K, on the end of each of the horizontal reel-shafts. The bugs are jarred or swept off the plants, by the downward returning sweep of the reel-slats, into the box or bed B of the frame A, which is made removable, to empty out the gathered bugs, by dropping the reel-bands, and taking off the "wings" or "trays" M M, by turning the hooks which secure them to the pivoted bars $b\ b$. The box can now be removed to get rid of the insects by passing forward or backward between the uprights H H. The bars $b\ b$, just mentioned, are each pivoted forward to short projecting bars $i$, each resting behind upon a similar bar, $i'$, provided with a slot and pin, which, passing through the bar $b$, confines it and its tray M to a lateral extension beneath the potato-tops to the extent of said slot; and they are each managed by the operator to adapt the machine to the width of space between the rows, by means of handles N, one to each bar, shaped like plow-handles. These bars each carry an inclined tray or chute, M M, which slopes inward into the box B, and are each fastened to their respective supporting-bars $b\ b$ by adjustable hooks, which are pivoted in the bars, and passing through slots in the bottom of the tray M. The frame may be mounted upon wheels both in front and rear too, if necessary. The standards H, which support the reels L L, rise from each corner of the frame A, each pair acting as supports for a cross-bar, I, one at each end of the machine, which carry the reel-shafts of the reels L L. These latter are raised or lowered adjustably upon said standards by means of a mortise in the end of each bar, and adjusting-pins set in holes in the tops of each standard H, or by other simple means or devices.

The operation of this machine is as follows: It is drawn between the potato-rows by one horse, or by hand, guided by the operator, who manages the handles N N, regulating by the latter the spread of the wings or trays M M, according to the distance between the rows, at the same time that the reels L L sweep or jar the bugs into the said trays, which convey them to the central box B.

To dispose of the collected bugs the reel-bands $a\ a$ are dropped, and the trays M M removed by turning the hooks in the slots in the same, which liberates the trays, so that the box is easily removable to the front or rear through the standards H H. The reels, with their bars I I, are raised or lowered, to suit the growth of the potato-tops, by means of a pin and holes in the standards H H, &c.

What I claim as my invention is—

In combination with the removable central box B and reels L L, the bars $b\ b$, provided with the removable wings or trays M M and handles N N, and pivoted to the front of the machine, and arranged to adjust the wings to the width of the row, substantially as and for the purpose set forth.

In testimony that I claim the foregoing potato-bug-gathering machine, I have hereunto set my hand this 15th day of May, A. D. 1874.

WILLIAM G. SWARTZ.

Witnesses:
G. PRALL,
J. S. PUMYEA.